United States Patent [19]

Donner

[11] 4,340,203
[45] Jul. 20, 1982

[54] THREE WAY SLIDE VALVE WITH CENTER RETURN

[75] Inventor: Verne P. Donner, Palatine, Ill.

[73] Assignee: Deltrol Corp., Bellwood, Ill.

[21] Appl. No.: 196,372

[22] Filed: Oct. 14, 1980

[51] Int. Cl.³ .......................... F16K 3/02; F15B 13/04
[52] U.S. Cl. ................................. 251/322; 137/359;
137/625.25; 137/625.68; 251/337; 251/367
[58] Field of Search ............. 137/359, 625.25, 625.68;
251/367, 337, 322

[56] References Cited

U.S. PATENT DOCUMENTS

| 1,586,691 | 6/1926 | Murray | 251/367 X |
|---|---|---|---|
| 2,394,487 | 2/1946 | Rotter et al. | |
| 2,443,975 | 6/1948 | Baker | 339/141 X |
| 2,531,511 | 11/1950 | Hill | |
| 2,796,230 | 6/1957 | Grove et al. | |
| 2,822,823 | 2/1958 | Klein et al. | |
| 2,858,851 | 11/1958 | Holl | |
| 2,979,080 | 4/1961 | Hewitt | |
| 2,998,828 | 9/1961 | Hare | |
| 3,028,880 | 4/1962 | Reitman | |
| 3,285,281 | 11/1966 | Pribonic et al. | 137/625.25 X |
| 3,324,888 | 6/1967 | Henderson | |
| 3,432,141 | 3/1969 | Irti et al. | |
| 3,763,891 | 10/1973 | Stiltner | |
| 3,776,276 | 12/1973 | Stiltner | |
| 4,098,291 | 7/1978 | Clark et al. | |
| 4,145,025 | 3/1979 | Bergeron | 137/625.66 X |
| 4,239,058 | 12/1980 | Peters | 137/625.66 X |

Primary Examiner—Gerald A. Michalsky
Attorney, Agent, or Firm—John L. Harris

[57] ABSTRACT

A three way slide valve includes a rectangular valve slide fitted into a housing formed of two halves having mating flat surfaces. Each housing half is recessed to provide a chamber for the valve slide and also a spring chamber which restrains both ends of a double acting return spring. One end of the return spring engages one end of the valve slide and the other part of the spring engages a loop on the valve slide for return to center action. Ports in the housing halves are provided with shear seals in engagement with the valve slide.

6 Claims, 18 Drawing Figures

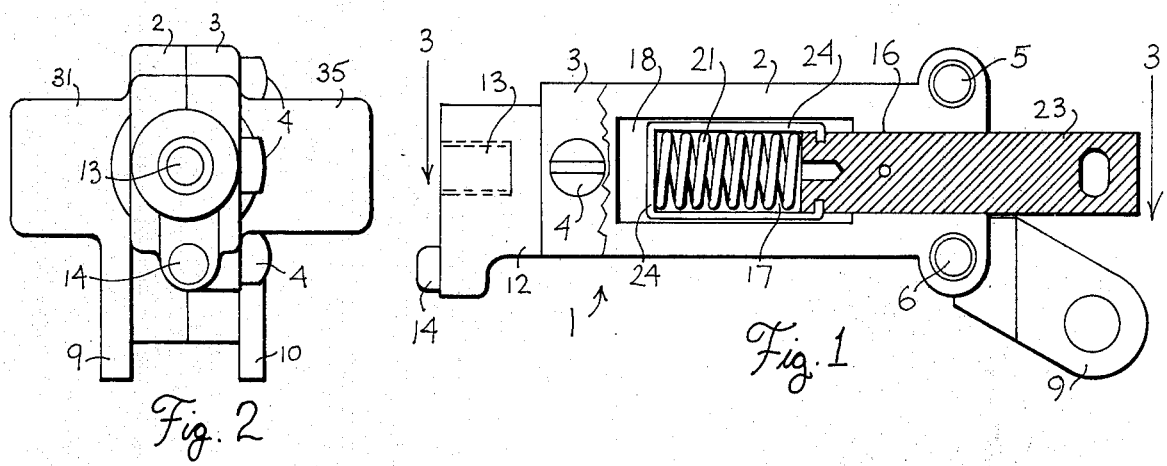
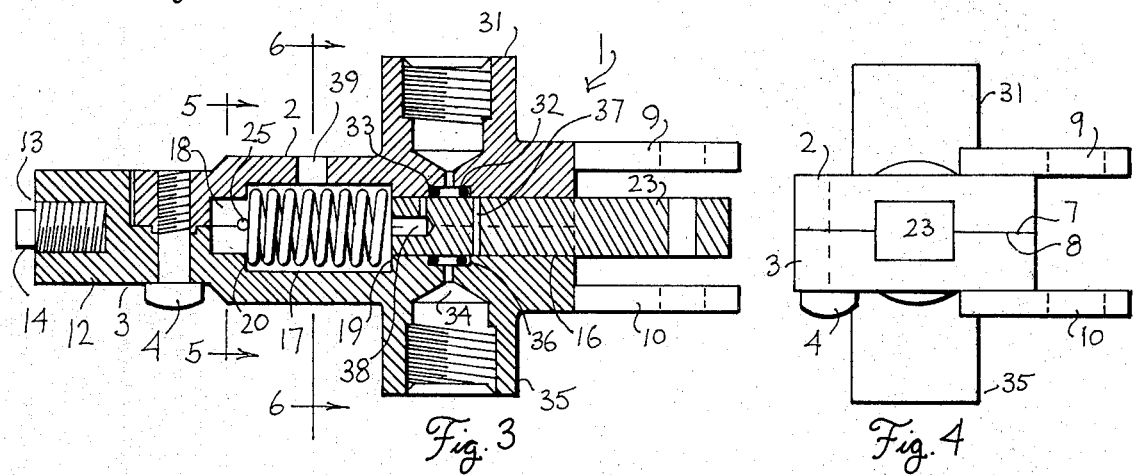
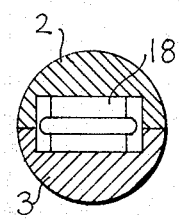
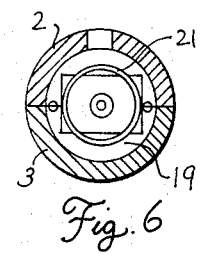
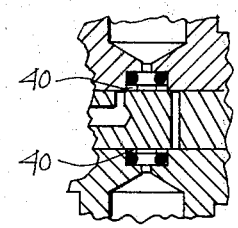
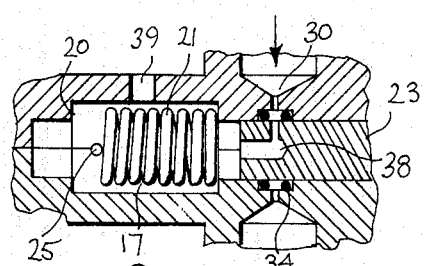
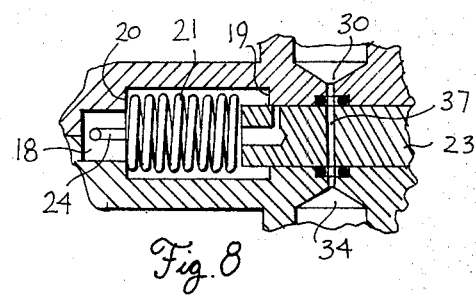

4,340,203

THREE WAY SLIDE VALVE WITH CENTER RETURN

BRIEF SUMMARY OF THE INVENTION

This invention relates to valve mechanisms and more particularly to manually operated three way slide valves in which the slide is spring biased to center position.

The primary object of the invention is to provide a simple, dependable, low cost valve mechanism having a minimum of parts easily assembled.

Another object is to provide a simplified self-centering slide valve mechanism in which a single spring biases the slide from either end position to the center.

These objects are achieved by providing a two part casing having one chamber for the valve slide and an adjacent chamber for the spring. The spring is compressed by the ends of the spring chamber and also is engagable at both ends by the slide valve means.

Another object of the invention is to provide a spring activated self-centering slide valve mechanism in which a single part serves as a valve slide and engages both ends of the spring.

Other objects of the invention will appear from the following detailed description and appended claims.

BRIEF DESCRIPTION OF DRAWINGS

FIG. 1 is an external side view of one form of slide valve mechanism having part of one housing member cutaway to show the valve slide and spring arrangement;

FIG. 2 is a view of the valve housing from the left end as seen in FIG. 1;

FIG. 3 is a sectional view taken on line 3—3 of FIG. 1;

FIG. 4 is a right hand end view of FIG. 3;

FIG. 5 is a sectional view taken on line 5—5 of FIG. 3;

FIG. 6 is a sectional view taken on line 6—6 of FIG. 3;

FIG. 7 is a fragmentary sectional view similar to FIG. 3 showing the valve slide in exhaust position;

FIG. 8 is a sectional view similar to FIG. 7 showing the valve slide in pressure position;

FIG. 9 is a fragmentary sectional view showing a modified form of sealing means;

DETAILED DESCRIPTION OF THE INVENTION

Figure 10:
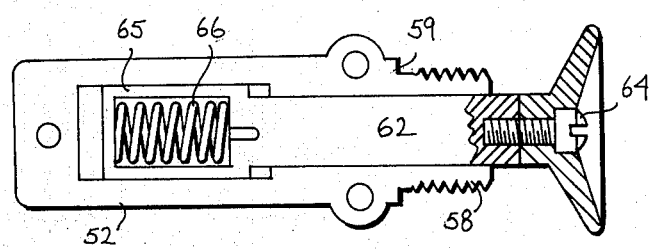
FIG. 10 is a side view of a modification with one of the housing members removed.
Figure 12:
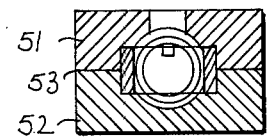
FIG. 12 is a sectional top view taken on line 12—12 of FIG. 11.

Referring to FIGS. 1 through 4, reference character 1 indicates generally a valve housing formed of housing parts 2 and 3 joined together by a screw 4 and two other screws (not shown) fitting in holes 5 and 6 which are in each housing part. Each housing part preferably forms approximately one half of the complete valve housing 1. These housing halves preferably have flat mating surfaces 7 and 8 (FIG. 4) which are pressed together by the retaining screws 4. The valve housing 1 may be mounted at the right hand end by mounting lugs 9 and 10 which are integral with the housing parts 2 and 3 respectively. The left hand end of the housing may include a mounting means or base 12 which is formed entirely on the housing member 3. As shown in FIGS. 2 and 3, this base extends over the end of housing half 2 and includes a screw threaded opening 13 and a locating stud 14.

The two housing halves are formed to provide a generally rectangular slide valve chamber 16, a generally circular spring chamber or space 17 and a rectangular extension chamber 18. Preferably one half of each chamber is formed in each housing half. As shown in FIG. 3, the diameter of the spring chamber 17 is greater than the width of the slide valve chamber, providing a shoulder 19 joining these chambers. Also the diameter of the spring chamber 17 is greater than the width of the extension chamber 18, providing a shoulder 20 between these chambers. A return spring 21 is located in the spring chamber 17 and is held compressed between the shoulders 19 and 20.

As shown in FIG. 3, the slide valve chamber 16 opens at its left hand end into the spring chamber. At its right hand end the slide valve chamber extends to the exterior of the valve housing. A rectangular slide valve member 23 is located in chamber 16 and extends beyond the valve housing for external operation. As shown in FIG. 1 an extension 24, preferably a wire form, is attached to the left end of the slide valve member 23 and extends around the left end of the spring 21. This extension 24 is generally "U" shaped including a crossover section 25 located in the extension chamber 18.

The valve housing part 2 is formed with a valve port 30 at the end of a threaded pipe connection 31. A circular recess 32 is formed in the housing part 2 and receives an "O" Ring 33 which is pressed into contact with the upper face of the valve slide 23. The housing part 3 is formed with a similar valve port 34 at the end of a pipe connection 35 and is provided with a similar "O" Ring 36. As shown in FIG. 3, the valve slide is formed with a pressure passage 37 which extends straight through the slide. The slide is also provided with an L shaped exhaust port 38 having one leg extending to the upper face of the valve slide, the other leg extending to the end of the valve slide. The housing member 2 as shown in FIG. 3 is formed with an exhaust port 39 which is in communication through the spring chamber with the exhaust passage 38 in the valve slide.

In assembly the spring is laid in one half of the spring chamber and the slide valve means including valve slide 23 and extension 24 are laid in this same housing part. The other housing part is then put in place and secured by screws 4. Tightening of the screws moves or forces the two housing parts together, compressing the O Rings 33.

With the parts as shown in FIG. 3, the valve slide is in center position in which both the pressure passage 37 and exhaust passage 38 are out of communication with the ports 30 and 34. The "O" Rings 33 and 34 serve as shear seals engaging the flat surfaces of the valve slide 23 and prevent leakage at these points. It should be noted that the spring 21 is held compressed between the shoulders 19 and 20 in the spring chamber. The valve slide is held in this center position by engagement of the spring 21 with the slide at one end and with engagement of the extension 24 at its other end.

When the valve slide is pulled to the right as shown in FIG. 7, the exhaust passage 38 is moved into communication with the valve port 30 which allows fluid to pass from this port through the spring chamber 17 out through the exhaust passage 39. At this time the pressure passage 34 is sealed off. It should be noted that as the valve slide 23 is pulled to the right, the cross member 25 of extension 24 has engaged the left end of the spring 21 and compressed the spring. When the valve slide is released the spring 21 will expand pushing the slide and spring extension to the left until spring 21 engages shoulder 20 in the valve housing. This moves the valve slide back to the center position shown in FIG. 3.

When the valve slide 23 is pushed to the left as shown in FIG. 8, passage 37 in the valve slide is moved into registry with the ports 30 and 34 which allows fluid to pass from the pressure port 34 through the work chamber port 30. Due to engagement of the slide valve member 23 with the right hand end of spring 21, the spring is compressed between the valve slide and the shoulder 20. At this time the extension 24 attached to the valve slide passes into the extension chamber 18 in the valve housing. When the slide valve member means 23-24 is released, the spring 21 expands moving the slide valve to the right until the end of spring 21 engages shoulder 19. At this time the valve is back to mid position as shown in FIG. 3.

FIG. 9 shows a modification of the shear seal arrangement. In this case the cavities for the O Rings are made deeper and sealing washers 40 are forced by the O rings into engagement with the flat surfaces of the slide valve member. These sealing washers are preferably formed of self lubricating thermo plastic material.

FIGS. 10-15

In this modification, the valve housing consists of two almost identical halves 51 and 52 having flat mating surfaces 53 secured together by screws 54. These housing members are formed inside to provide a rectangular crosssectioned slide valve chamber 55, a circular spring chamber 56 and a rectangular extension chamber 57. The housing is formed with a threaded mounting stud 58 at its right hand end terminating at a shoulder 59. One half of the threaded mounting stud 58 is formed on housing half 51 and the other half of the mounting stud is formed on housing half 52. A mounting nut 60 serves to clamp the valve housing to a suitable panel on which the unit is mounted.

Figure 11:
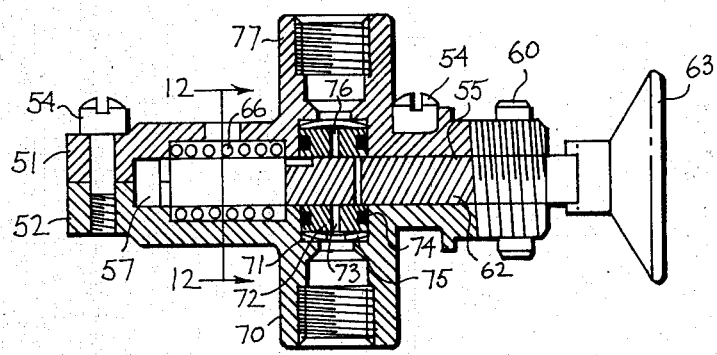
FIG. 11 is a partly sectional view of FIG. 10.
Figure 13:
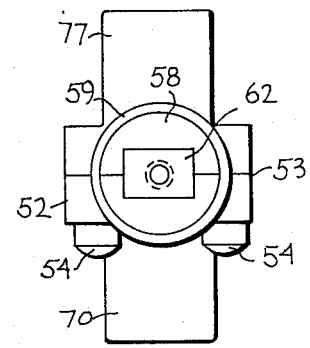
FIG. 13 is a right hand end view of FIG. 11.

A slide valve member 62 is fitted in the slide valve chamber 55 and extends beyond the housing receiving a manual operating knob 63 attached to the valve slide by a screw 64. In this embodiment of the invention the spring loop 65 is an integral part of the slide valve means. This spring loop 65 as shown in FIG. 10 extends over the return spring 66 located in the spring chamber 56. The shoulders at the end of the spring chamber 56 maintain spring 66 compressed in the same manner explained in connection with FIG. 3. These shoulders in combination with the spring loop on the valve slide serve to bias the valve slide to center position as shown in FIG. 11.

The housing member 52 is formed with a inlet threaded pipe connection 70 communicating with a shear seal chamber 71 receiving a shear seal disk 72 having an inlet port 73. The shear seal member 72 is circular and is grooved at its outside edge to receive an "O" Ring 74 which is pressed against the walls of the recess receiving the shear seal. The shear seal disk 72 is forced against the flat surface on valve member 62 by means of a spring disk 75. The upper valve housing part 51 is similarly formed and receives an identical shear seal having a port 76 communicating with a threaded pipe connection 77.

Figure 14:
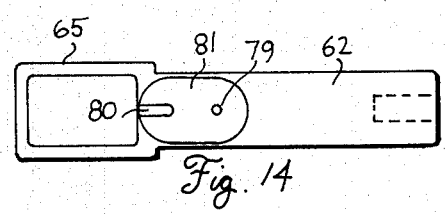
FIG. 14 is a detailed side view of the slide valve member shown in FIGS. 10 and 11.
Figure 15:
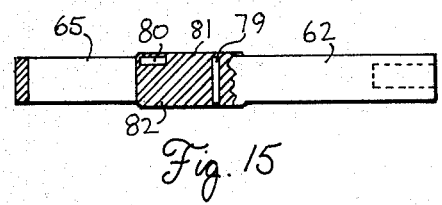
FIG. 15 is a top view partly in section of the slide valve shown in FIG. 14.

As shown more clearly in FIGS. 14 and 15 the slide valve 62 includes a straight through passage way 79 and an exhaust passage way 80 molded into the top of the slide valve.

Preferably the slide valve 62 is made slightly thicker at the valve passages 79 and 80 than the remainder of the part. This provides for high precision surfaces 81 and 82 which are contacted by the shear seals. Only these small sections need to be held to precision dimensions making the part less expensive to manufacture than if the entire surfaces were precision.

The operation is identical with the embodiment of the invention previously described. The spring 66 serves to hold the valve slide means in mid-position. When the slide is pushed to the left the spring is compressed providing a return force to return the slide to mid-position when the slide is released. When the slide is pulled to the right the integral extension 65 compresses the spring providing a return force for returning the slide back to mid-position.

Figure 16:
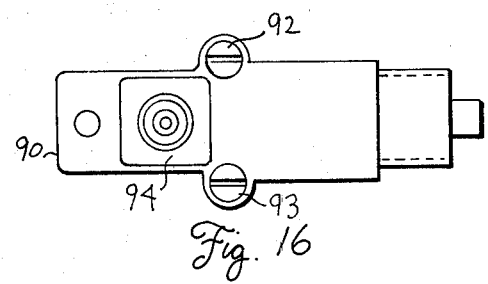
FIG. 16 is an external view of the third modification of the invention.
Figure 18:
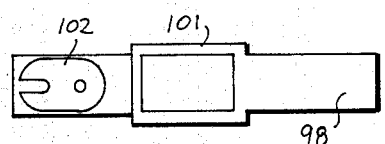
FIG. 18 is a detailed view of the slide valve used in FIGS. 16 and 17.
Figure 17:
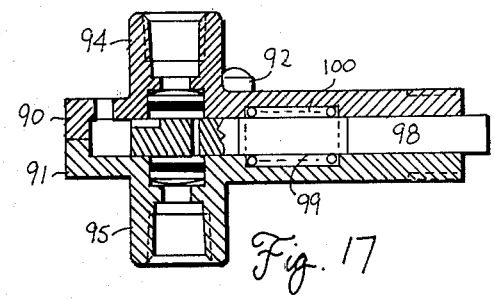
FIG. 17 is a sectional view similar to FIG. 11 of this modification.

FIGS. 16, 17, and 18

In this embodiment of the invention, the spring is located between the handle end of the valve slide and the valve ports. As shown in FIG. 17 this construction includes an upper valve housing 90 and a lower valve housing 91 which are secured together by two screws 92 and 93 (FIG. 16). The upper valve housing 90 includes a pipe thread external connection 94 in communication with a shear sealed valve port identical with that of FIG. 11. The lower valve housing includes a pipe thread connection 95 communicating with a shear seal identical with that previously described.

Valve housing parts 94 and 95 are formed to provide a valve slide cavity receiving the valve slide 98. The valve housing formed by members 90 and 91 also includes a spring chamber 99 receiving a compression spring 100. This compression spring 100 is compressed between two shoulders defining the end of the spring chamber 99.

As shown in FIG. 18 the valve slide 98 is formed similarly to the valve slide 65 of FIG. 16 except that the spring loop 101 is located between the handle end of the slide 98 and the valve end 102. The spring loop 101 engages both ends of the spring 100 and serves to bias the slide 98 to the mid position in the same manner as described in the other embodiments of the invention. The advantage of the construction shown in FIGS. 16, 17, and 18 is that it enables the fastening screws 92 and 93 to be located centrally of the housing making it possible to use only two screws instead of three as in the other embodiments of the invention.

From the foregoing description it will be apparent that the invention provides a simple, inexpensive and easily assembled valve mechanism. While only three embodiments of the invention have been shown and described it is apparent that many modification may be made without departing from the spirit and scope of the invention as defined in the following claims.

I claim:

1. In a valve mechanism, a valve housing formed of two moulded housing parts joined together, said housing parts defining a slide valve chamber, a slide valve member in said chamber, operating means for the slide valve member extending through one end of said housing, a threaded mounting stud for the housing through which said operating means extends, a portion of said stud being formed on one housing part and another portion of the stud being formed on the other housing part, said housing parts being separable and joined together after installation of the slide valve member.

2. A valve mechanism as defined in claim 1 in which the two housing parts have flat mating surfaces, and valve ports cooperating with flat valving surfaces on the slide valve member.

3. A valve mechanism as defined in claim 1 in which the two housing parts have elongated mating surfaces and are joined together by a pair of fastening means, said fastening being on opposite sides of the slide valve member and located at a point causing substantial portions of the mating surfaces to extend beyond the fastening means in each direction, enabling said pair of fastening means to be the sole means holding the housing parts together.

4. In a valve mechanism, a valve housing having a slide valve chamber and an adjoining spring chamber of larger cross-section than the slide valve chamber providing a shoulder at the junction of the spring chamber with the slide valve chamber, slide valve member means movably mounted in the slide valve chamber and having a rectangular portion adjacent to the spring chamber, said valve housing being formed of two parts contacting opposite faces of the slide valve member means, said housing parts having elongated mating surfaces and cooperating to form the slide valve chamber said valve housing being formed with at least one valve port controlled by the slide valve member means, said valve housing also being formed with an opening at one end leading from the slide valve chamber to the outside of the housing, and the slide valve member means including operating means passing through said opening for operating the slide valve member means from outside the housing, spring means in the spring chamber arranged to engage the rectangular portion of the slide valve member means and said shoulder, said spring means urging the slide valve means in a predetermined direction and being stopped by the shoulder, said spring chamber being located in the housing between the valve port and the opening for the operating means.

5. The combination recited in claim 4 in which the slide valve member means is a single integral member having a valve passage inside the housing and extending through the opening in the housing to outside the housing.

6. The combination recited in claim 4 in which a pair of fastening means secures said housing parts together, said fastening means being on opposite sides of the slide valve member means, said fastening means also being located between the valve port and the open end of the housing, causing substantial portions of the housing part mating surfaces to extend beyond the fastening means in each direction, enabling said pair of fastening means to be the sole means holding the housing parts together.

* * * * *

Notice of Adverse Decision in Interference

In Interference No. 100,994, involving Patent No. 4,340,203, V. P. Donner, THREE WAY SLIDE VALVE WITH CENTER RETURN, final judgment adverse to the patentee was rendered Aug. 3, 1984, as to claim 4.

*[Official Gazette January 29, 1985.]*